United States Patent [19]
Moyer

[11] Patent Number: 5,871,139
[45] Date of Patent: Feb. 16, 1999

[54] DEBRAZING OF STRUCTURES WITH A POWDERED WICKING AGENT

[75] Inventor: Craig R. Moyer, Sunnyvale, Calif.

[73] Assignee: Praxair S.T. Technology, Inc., Danbury, Conn.

[21] Appl. No.: 690,780

[22] Filed: Aug. 1, 1996

Related U.S. Application Data

[60] Continuation-in-part of Ser. No. 493,073, Jun. 21, 1995, abandoned, which is a division of Ser. No. 277,974, Jul. 20, 1994, Pat. No. 5,439,637.

[51] Int. Cl.⁶ .................................................. B23K 1/018
[52] U.S. Cl. .......................................... 228/264; 228/119
[58] Field of Search ................................... 228/264, 191, 228/119, 35, 19; 29/402.11, 426.1; 156/344

[56] References Cited

U.S. PATENT DOCUMENTS

| | | | |
|---|---|---|---|
| 4,101,691 | 7/1978 | Borchert | 427/229 |
| 4,274,908 | 6/1981 | Fishter et al. | 156/637 |
| 4,302,246 | 11/1981 | Brindisi, Jr. et al. | 75/101 |
| 4,324,626 | 4/1982 | McGivern, Jr. | 204/146 |
| 4,416,408 | 11/1983 | Spirig | 228/264 |
| 4,923,521 | 5/1990 | Liu et al. | 228/119 |
| 5,021,213 | 6/1991 | Nishio et al. | 419/36 |
| 5,040,718 | 8/1991 | Lee et al. | 228/119 |
| 5,072,873 | 12/1991 | Liu et al. | 228/264 |
| 5,152,448 | 10/1992 | Williams | 228/264 |
| 5,167,720 | 12/1992 | Diamond et al. | 134/25.4 |
| 5,219,520 | 6/1993 | Brofman et al. | 419/35 |
| 5,542,601 | 8/1996 | Fallon et al. | 228/264 |

FOREIGN PATENT DOCUMENTS

| | | | |
|---|---|---|---|
| 4-258369 | 9/1992 | Japan | 228/264 |
| 606-695 | 4/1978 | U.S.S.R. | 228/264 |

*Primary Examiner*—Samuel M. Heinrich
*Attorney, Agent, or Firm*—Robert J. Feltovic

[57] ABSTRACT

Coating a structure such as a brazed joint with a powdered wicking agent, preferably mixed with a fugitive liquid binder to form an adherent slurry, then heating the joint to allow the brazing alloy to melt and be drawn into the powdered wicking agent by capillary action. After cooling, the powder and braze alloy are mixed together to form a loosely consolidated mass which can be readily removed by mechanical and/or chemical means so that the components can then be separated for repair or reuse.

15 Claims, 2 Drawing Sheets

DEBRAZING OF STRUCTURES WITH A POWDERED WICKING AGENT

RELATED APPLICATION

This application is a continuation-in-part of now abandoned U.S. Ser. No. 08/493,073 filed Jun. 21, 1995 which is a division of U.S. Ser. No. 08/277,974 filed Jul. 20, 1994, now U.S. Pat. No. 5,439,637.

FIELD OF THE INVENTION

This invention relates generally to a metallurgical process for debrazing a brazed structure without damage to its components and more specifically to a process using a powdered material to pull and absorb braze metal from a previously brazed surface or joint by capillary attraction or wicking, after coating the surface or joint with powder and heating it to an elevated temperature.

BACKGROUND OF THE INVENTION

Many complex metal structures are assembled by brazing, a process of joining two metal surfaces by introducing a third metal, the brazing alloy or filler metal, between them at an elevated temperature. When the elevated temperature is relatively modest, e.g. below about 500° C., the process may be called soldering. Upon cooling, the two original surfaces, along with the filler alloy, are metallurgically bonded into a unitary structure. Often it would be very desirable to be able to reverse this process, i.e. remove the filler metal and allow the two component surfaces to be separated for repair or salvage. However, merely heating the structure again to the brazing temperature will not cause the filler alloy to simply flow out of the joint but instead may cause the bond to be strengthened by diffusion of the braze alloy into the components.

While the components may be made of almost any material, including ceramics, the components of most interest in this invention are made from nickel, cobalt, and iron based stainless steels and superalloys commonly used, for example, in the aerospace industry for gas turbine engine subassemblies. Such components are very expensive and worth salvaging for repair and reuse. Common brazing alloys used with these base metals include silver, copper, gold, and nickel based alloys.

One method currently used to separate brazed components is to soak them in a warm chemical bath until the braze alloy is chemically leached from the joint. However, such a process is often complex, very time consuming and frequently requires ultrasonic agitation, and the chemical media, which is often a strong acid, can cause damage to the components and/or the environment. See, for example U.S. Pat. No. 4,274,908 to Fishter at al. which discloses a complex nitric acid solution for removing gold--nickel braze alloy from superalloy parts; U.S. Pat. No. 4,302,246 to Brindisi et al. which discloses improved acid solutions; and U.S. Pat. No. 4,324,626 to McGivern which disclosed an electrolytically assisted acid leaching process.

It should be apparent from the foregoing that there has been a long felt need in this art for a more efficient process for disassembling a brazed structure without damage to its components.

SUMMARY OF THE INVENTION

This invention comprises providing a novel process for removing braze alloy from a brazed structure having one or more components, by applying powdered wicking agent to contact at least a portion of the braze alloy and heating the structure to an elevated temperature sufficient to allow the braze alloy to flow into the powdered wicking agent. The structure is cooled to room temperature so that the wicking agent and braze alloy solidify together, and substantially all the mass from adjacent the structure is removed.

In addition, the invention includes a novel combination of a wicking agent and a structure such as a joint to be debrazed. The powdered wicking agent (which may be a metallic or ceramic particulate material of various sizes and shapes) preferably is mixed with a liquefied, organic binder to form a viscous slurry that can be uniformly applied along the length of a joint to be debrazed. Such binders should be fugitive, i.e. will decompose and/or vaporize during the heating cycle and not interfere with the wicking action. Brazing fluxes may also be added to the slurry, to promote the wetting of the powder by the braze alloy, as is known in the art. Chemically reducing or inert cover gases or a vacuum atmosphere may be employed during furnace heating to prevent powder oxidation and/or also promote powder wetting. It is also preferable that the debrazing temperature not be substantially higher than the original brazing temperature so that the metallurgical structure of the components is not adversely affected.

BRIEF DESCRIPTION OF THE DRAWINGS

While this specification concludes with claims particularly pointing out and distinctly claiming the subject matter which is now regarded as the invention, it is believed that several of the features and advantages thereof may be better understood from the following detailed description of a presently preferred embodiment when taken in connection with the accompanying drawings in which:

DETAILED DESCRIPTION OF THE INVENTION

Figure 1:
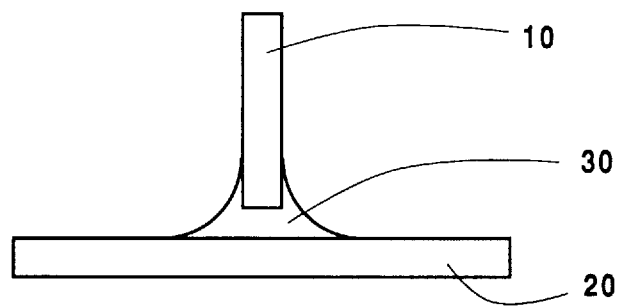
FIG. 1 is a representation, not to scale, of a typical brazed joint between two components which may be part of a larger structure.
Figure 2:
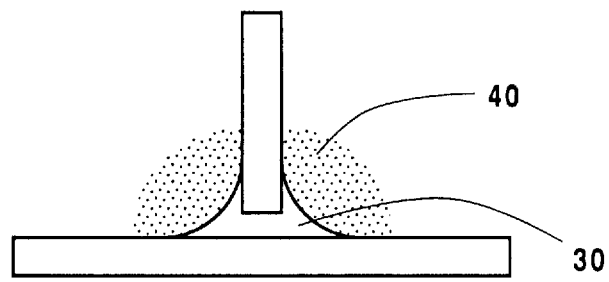
FIG. 2 is a representation of the joint overlaid with powdered wicking agent.

As illustrated in FIG. 1, a typical brazed joint comprises a first component 10 and a second component 20 with a mass of braze alloy 30 solidified therebetween to firmly bond the individual components into a unitary structure. When it is desired to disassemble the structure, the braze alloy 30 is overlaid, as illustrated in FIG. 2, with a powdered wicking agent 40. While the wicking agent 40 may be any particulate material having a higher melting temperature than, and is wetable by, the braze alloy 30 it is advantageous to use a fine (less than about 150 mesh) metal powder.

Powders of various sizes, less than about 50 mesh, and shapes, including flattened flakes and elongated fibers, have been successfully tested. Most preferably, flattened metallic powders are used. Such powders of aluminum, cobalt, copper, iron, nickel, and their alloys and/or mixtures thereof are readily available. In order for the agent 40 to adhere to convoluted joint shapes, it is advantageous to mix the particulate matter with a medium viscosity liquid fugitive binder to form a debrazing slurry. Such binders are well known in the art for use with brazing powders and decompose and/or volatilize at elevated temperatures so as not to interfere with the wicking action. Preferably, the volume of slurry (which itself preferably contains from 10 to 95 volume percent wicking agent 40, more preferably 15–60 volume percent of agent 40) to be used is approximately 2 to 3 times the volume of braze alloy 30 present in order to provide enough unconsolidated wicking agent (raw powder) to establish an excess of braze alloy absorption capability. When the wicking agent is elongated metallic fibers rather than spherical powders, the volume fraction may be as low as about 5–20% in the slurry and still give good results. It is believed that the greater pore-to-solid volume ratio provides more effective wicking action.

It may be advantageous to use a dispensing device, such as a caulking gun, to uniformly apply the slurry along convoluted or lengthy joints. The slurry preferably is sufficiently fluid to be extrudable through a small orifice in the size range of 1/64 to 1/4 inch diameter, such as typically found in commercial braze paste applicators, at pneumatic pressures in the range of 5 to 100 pounds per square inch. The slurry preferably adheres to the structure to be debrazed and is thick enough to not flow away before or during heating, that is, to retain its position during debrazing.

Once the brazed joint is overlaid with the wicking agent or slurry, it is heated for debrazing which may be by the same type of equipment used for brazing, such as manual oxyacetylene or plasma torches, radiation, resistance or induction heaters, or in a vacuum or gas atmosphere furnace all as is well known in the art. After heating the overlaid joint to a sufficiently high temperature, the braze alloy becomes fluid and all or most is drawn by capillary action out of the joint and into the small pores formed in the adjacent wicking agent 40. After cooling as illustrated in FIG. 3, the again solidified braze alloy and some of the wicking agent (powder) are found to be mixed together to form a loosely consolidated, porous mass 50 adjacent the joint.

This porous mass 50 is easily removed, for example by light grinding, blasting with grit or water under high pressure (as disclosed in U.S. Pat. No. 5,167,720) or soaking in a chemical stripping bath, so that the individual components, 10 and 20, can be separated for repair or reuse. The porous nature of the mass allows the chemical stripping media rapid access to a large amount of surface area of the braze alloy to be removed, thereby accelerating the process.

Figure 4:
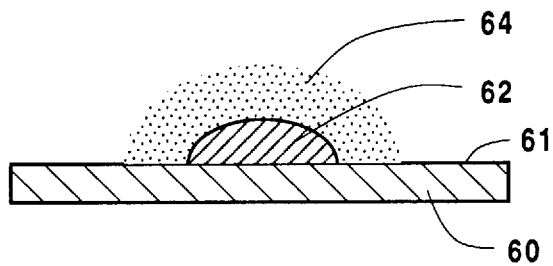
FIG. 4 is a side cross-sectional view of a single component having braze alloy bonded thereto in combination with a powdered wicking agent according to the present invention.
Figure 5:
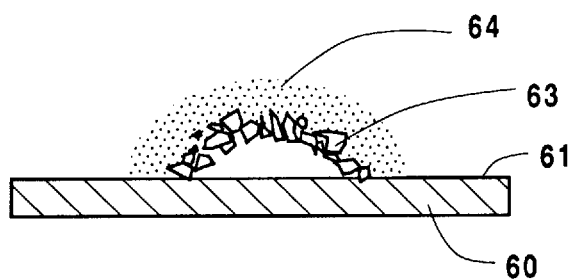
FIG. 5 shows the combination of FIG. 4 after heating.

A single component 60 is shown in FIG. 4 having braze alloy 62 bonded to a surface 61. Powdered wicking agent 64 has been placed in contact with braze alloy 62. The combination is then heated to an elevated temperature sufficient to allow the braze alloy 62 to freely flow into the powdered wicking agent 64 and is subsequently cooled. The cooled combination is shown in FIG. 5 as loosely consolidated mass 63, being a mixture of the braze alloy and the powdered wicking agent. This procedure is useful for removing excess braze alloy from one or more surfaces of a component.

Figure 3:
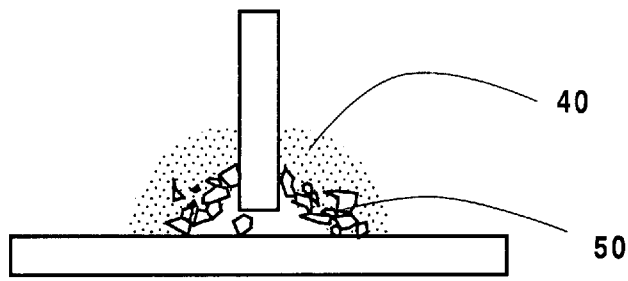
FIG. 3 is a representation of the joint after a debrazing heating and cooling cycle.

Flattened powder particles typically provide superior results for debrazing according to the present invention as compared to spherical or near-spherical shapes which tend to produce a solid or dense consolidated mass instead of the preferred loose consolidated mass shown in FIGS. 3 and 5. An open network within the powder is desired into which molten braze alloy flows in a wicking- or capillary-type manner.

Figure 6A:
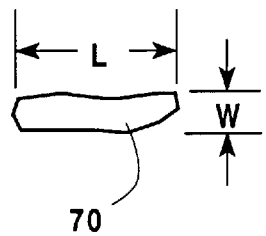
FIG. 6A and 6B are top and end views, respectively, of a flattened powder particle useful for the present invention.
Figure 6B:
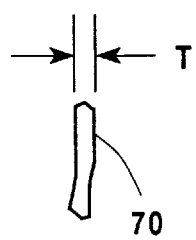

A preferred powder particle 70, FIG. 6A, has a width W that is small enough to pass through a Tyler 50 mesh screen. The length L ranges from 1 to 12 times the width W. The thickness T, FIG. 6B, typically is less than 0.7 times width W. The irregular surface of a preferred particle can also be described as preferably being at least ten percent greater, preferably at least twenty percent greater, than the surface area of a spherical particle.

The powdered wicking agent can include a mixture of size ranges or can be substantially uniform in size. Another factor which may be important in some debrazing situations is dilution of the wicked braze material because the debrazing powder particles are partially dissolved by the wicked braze alloy, thereby altering the alloy's chemical composition. This effect is maximized by lowering the debrazing particle size which increases the surface contact : area to the wicked alloy. Altering particle shape also improves the alloy dilution effect. A flattened particle of the same weight as a spherical particle can have a much larger surface area. This dilution effect is important, especially for fine iron powders, and will accelerate the chemical removal of wicked braze alloy by reducing the resistance to chemical attack regardless of the degree of openness of the consolidated mass.

EXAMPLES

A gas turbine stator assembly was cleaned and prepared for debrazing by overlaying all brazed joints with a slurry of flattened iron powder (e.g. mesh fraction minus 150, plus 325) and a water soluble binder (e.g. Nicrobraz 650). The volume ratio of slurry to braze alloy was at least three to one to ensure an excess of wicking agent. After air drying for a short time, the assembly was loaded into a vacuum furnace (with sufficient support tooling to prevent distortion) and heated to a sufficient temperature to melt the braze alloy. That is, for assemblies brazed with AMS 4787 (a gold base alloy), heat to 1850° F.; for AMS 4777 (a nickel base alloy), heat to 1910°to 1950° F.; for PWA 996 (another nickel base alloy), heat to 2040°to 2060° F. The proper temperature for other braze alloys may easily be determined by those skilled in this art. The parts were held at temperature for about 25 to 30 minutes, long enough for the braze alloy to be drawn out of the joint by the wicking agent. After cooling, the assembly was inspected for complete coverage of all brazed joints by the wicking agent. If some areas have been missed, the procedure could he repeated. However, depending upon the specific materials involved, it is preferable to limit the number of repeats to no more than two to avoid any undesirable changes in the metallurgical microstructure of the components. More preferably, the structure is heated only once or twice to a temperature above the melting temperature of the braze alloy.

After the debrazing cycle, some of the wicking agent was combined with the braze alloy to form a loosely consolidated, porous mass adjacent the joint. This mass was easily removed by soaking the assembly in a warm (about 140±15° F.) nitric acid based stripping solution for about 10 hours allowing the components to be separated without damage. Occasionally, some assemblies contain a few small tack welds originally used to position the components for brazing. Any welds still remaining after the acid bath may be removed by light grinding.

While the present invention has been described in terms more or less specific to one preferred embodiment, it is expected that various alterations, modifications, or permutations thereof will be readily apparent to those skilled in the art. Therefore, it should be understood that the invention is not to be limited to the specific features shown or described, but it is intended that all equivalents be embraced within the spirit and scope of the invention as defined by the appended claims.

What is claimed is:

1. A process for disassembling a brazed structure, of the type having two or more components bonded by metallic braze alloy in a joint, comprising the steps of:

a) applying a powdered wicking agent to continuously overlay said joint, said wicking agent comprising a powder having a melting temperature higher than that of said braze alloy and being wetable by said braze alloy when said joint is heated above the melting temperature of said braze alloy;

b) heating the joint overlaid with said powdered wicking agent to an elevated temperature sufficient to allow the braze alloy to flow out of the joint and into the powdered wicking agent;

c) cooling the joint to room temperature so that the wicking agent and braze alloy solidify together to form a loosely consolidated mass adjacent the joint;

d) removing substantially all said consolidated mass from adjacent the joint; and e) separating the components from one another.

2. A process for removing braze alloy from a brazed structure, comprising the steps of:

a) applying a powered wicking agent to contact at least a portion of said braze alloy, said wicking agent comprising a powder having a melting temperature higher than that of said braze alloy and being wetable by said braze alloy when said structure is heated above the melting temperature of said braze alloy;

b) heating the structure contacted by said powdered wicking agent to an elevated temperature sufficient to allow the braze alloy to flow into the powdered wicking agent;

c) cooling the structure so that the wicking agent and braze alloy solidify together adjacent the structure; and d) removing substantially all said wicking agent from adjacent the structure together with said solidified braze alloy.

3. The process of claim 2 wherein said wicking agent and said braze alloy solidify together to form a loosely consolidated mass.

4. The process of claim 2 wherein step a) includes mixing said powder with a liquid binder to form a slurry and applying the slurry adjacent the braze alloy.

5. The process of claim 4 wherein said powder is selected from the group consisting of: aluminum, cobalt, copper, iron, nickel and alloys or mixtures thereof.

6. The process of claim 4 wherein said powder is in the form of flattened flakes or elongated fibers.

7. The process of claim 4 wherein the step of applying includes completely covering the braze alloy.

8. The process of claim 4 wherein the powder is a powdered ceramic material.

9. The process of claim 4 wherein said slurry contains 10 to 95 volume percent wicking agent and is applied along the braze alloy in a ratio of at least about three parts by volume slurry for each part by volume braze alloy.

10. The process of claim 4 wherein said powder is minus 50 mesh in size.

11. The process of claim 5 wherein the size of said powder is minus 150, plus 325 mesh.

12. The process of claim 4 wherein step b) is performed in a vacuum furnace or in a gas atmosphere furnace.

13. The process of claim 4 wherein step d) is accomplished by at least one of grinding said mass from said joint, grit blasting said mass from said joint, blasting said mass from said joint with a high pressure water spray, and soaking said joint in a chemical stripping bath.

14. The process of claim 13 wherein said chemical stripping bath comprises a warm nitric acid solution.

15. The process of claim 4 wherein step b) includes heating the structure only once or twice to a temperature above the melting temperature of said braze alloy.

* * * * *